(12) United States Patent
Orczykowski et al.

(10) Patent No.: US 6,701,211 B2
(45) Date of Patent: Mar. 2, 2004

(54) COMPUTER-AIDED CONTROL METHOD FOR A MACHINE TOOL

(75) Inventors: Jürgen Orczykowski, Erlangen (DE);
Uwe Scheuermann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/241,006

(22) Filed: Sep. 10, 2002

(65) Prior Publication Data
US 2003/0050727 A1 Mar. 13, 2003

(30) Foreign Application Priority Data
Sep. 10, 2001 (DE) .......................... 101 44 482
May 6, 2002 (DE) .......................... 102 20 166

(51) Int. Cl.[7] .......................... G06F 19/00; B23B 3/00; B23B 7/00; B23B 9/00
(52) U.S. Cl. .......................... 700/191; 82/118
(58) Field of Search ................. 700/160, 190, 700/191; 82/118

(56) References Cited

U.S. PATENT DOCUMENTS

| | | | | |
|---|---|---|---|---|
| 4,025,764 A | * | 5/1977 | Tack | 700/191 |
| 4,672,551 A | * | 6/1987 | Ookuma et al. | 700/187 |
| 5,112,169 A | * | 5/1992 | Ryoki et al. | 409/66 |
| 6,535,788 B1 | * | 3/2003 | Yoshida et al. | 700/191 |

* cited by examiner

Primary Examiner—Leo Picard
Assistant Examiner—Ryan Jarrett
(74) Attorney, Agent, or Firm—Henry M. Feiereisen

(57) ABSTRACT

A control command is provided to a control computer, by which a workpiece can be machined by a machine tool over a predetermined total height and a predetermined contiguous region by cutting, in particular by turning with a lathe. The control computer automatically determines, based on the control command, a number of travel paths, based on which the workpiece is machined in the predetermined region over a partial height until reaching the total height. The control computer determines the travel paths so that the partial height is varied.

12 Claims, 2 Drawing Sheets

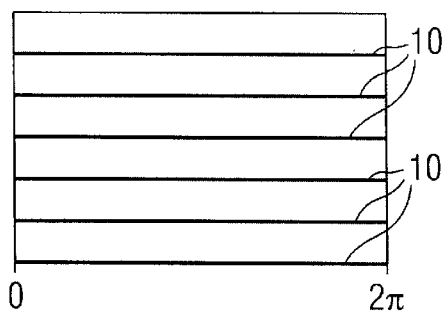
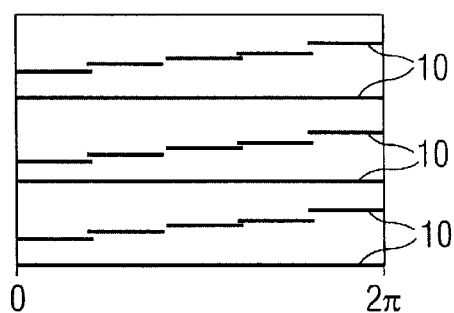
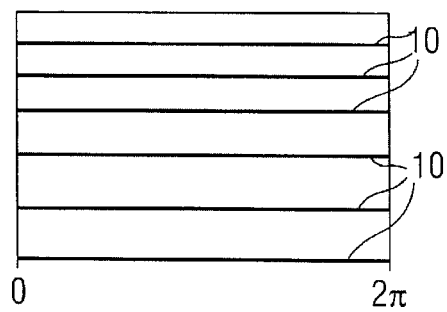
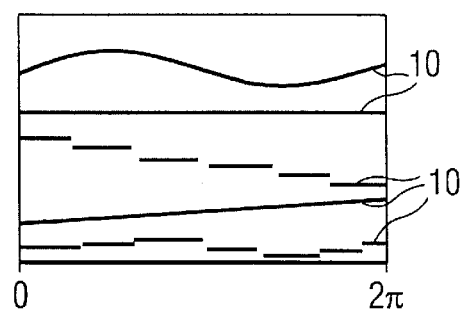
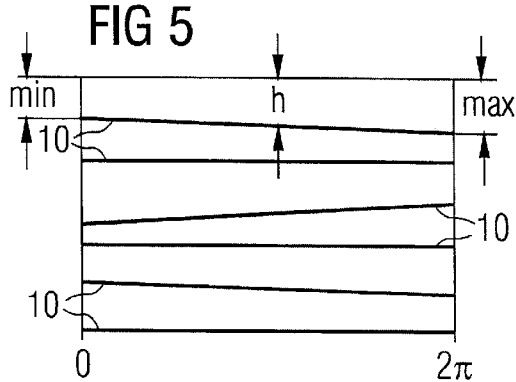

COMPUTER-AIDED CONTROL METHOD FOR A MACHINE TOOL

CROSS-REFERENCES TO RELATED APPLICATIONS

This application claims the priority of German Patent Applications, Serial Nos. 101 44 482.6, filed Sep. 10, 2001, and 102 20 166.8, filed May 6, 2002, pursuant to 35 U.S.C. 119(a)–(d), the subject matter of which is incorporated herein by reference.

BACKGROUND OF THE INVENTION

The present invention relates to a computer-aided control method for a machine tool which can be used to machine a workpiece by cutting, for example, by turning in a lathe.

Control methods, wherein a control command is provided to a control computer, based on which the workpiece is machined with a tool over a contiguous region and over a total height, and wherein the control computer automatically determines a number of travel paths based on the control command, with the workpiece successively machined over a partial height until the total height is reached, are known in the art. These control methods simplify and automate machining by allowing larger contiguous regions of a workpiece to be cut.

Conventional methods determine the travel paths so that the partial height (sometimes also referred to as cutting depth) is constant. This can cause premature tool wear through the formation of grooves in the cutting tool. This premature wear can be prevented by avoiding the use of such control commands. In other words, wear can only be prevented if a machine operator manually programs each travel path. This approach is not only time consuming and arduous, but more importantly may cause errors.

It would therefore be desirable to modify the conventional computer-aided control methods for a machine tool so as to prevent or at least significantly reduce premature wear of the machining tool.

SUMMARY OF THE INVENTION

According to an aspect of the invention, a computer-aided control method for a machine tool adapted for machining a workpiece by cutting, in particular by lathe turning, includes providing a control command to a control computer, based on which the workpiece is machined with a tool over a contiguous region and over a total height, with the control computer based on the control command automatically determining a number of travel paths, based on which the workpiece is machined in the region over a partial height and altogether over the entire height, wherein the determined travel paths have variable partial heights.

In this way, the wear of the cutting tool is thereby evened out by distributing the wear over a larger area of the tool. This increases the service life of the tool.

The increased complexity of the travel paths is hereby transferred to the computer-aided determination of the travel paths. Advantageously, the travel paths have to be determined only once and can be tested in advance. This approach makes it possible to cut different partial heights even for arbitrary contours, so that the process is not limited to machining only cylindrical or flat parts, but parts of arbitrary geometry, for example cast parts.

Advantageous embodiments of the invention may include one or more of the following features.

The partial height can be constant during the travel paths, but can vary between the travel paths. Alternatively, the partial height can vary during at least one of the travel paths, or during each of the travel paths. The partial height can vary continuously or in steps, as well as alternatingly or monotonously.

The partial height can vary between a minimum value and a maximum value, with a maximum value between 2 and 10 mm, whereby the ratio of minimum value to maximum value can be between 0.5 and 0.9, in particular between 0.6 and 0.8, or more particularly between 0.65 and 0.75. The ratio of minimum value to maximum value can also be preset in the control computer as a parameter.

If the partial height is only varied when the control computer issues a release command, then varying the partial height can be blocked if such a variation is not desired in certain situations.

Further aspects of the invention include a computer program product for carrying out the aforedescribed control method as well as a control computer executing the computer program product.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a conventional travel path with constant partial height h;

FIG. 4 shows an exemplary travel path with an increasing partial height h between travel paths;

FIG. 5 shows an exemplary travel path with a pattern alternating between oblique and straight paths;

FIG. 6 shows an exemplary travel path with a step-wise variation of the partial height; and FIG. 7 shows an exemplary travel path with an irregular pattern.

DETAILED DESCRIPTION OF PREFERRED EMBODIMENTS

Figure 1:
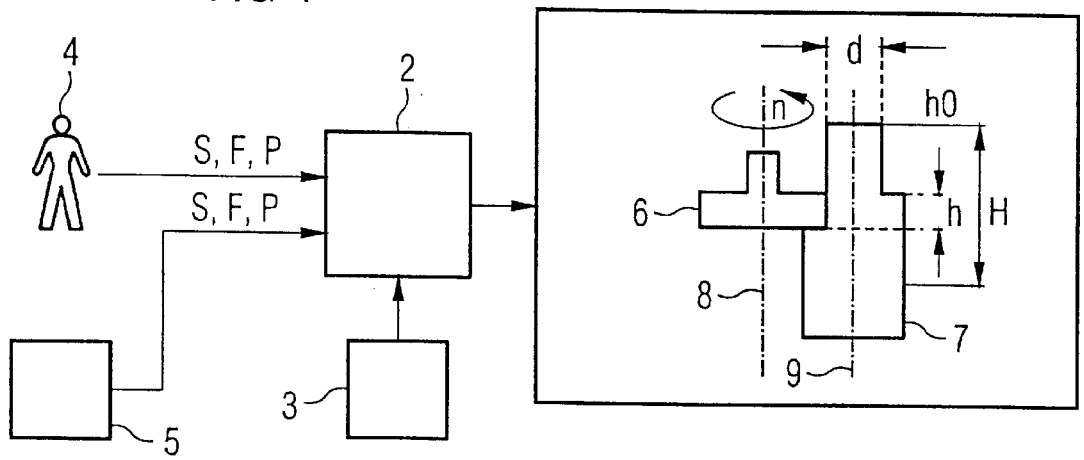
FIG. 1 shows a schematic block diagram of an exemplary machine tool.

Referring first to FIG. 1, a machine tool 1 is controlled by a control computer 2. The operating characteristic of the control computer 2 is determined by a computer program 3 which in conjunction with control commands S is used to program the control computer 2. The control commands S can be provided either by a user 4 or via a batch file 5.

The machine tool 1 depicted in FIG. 1 is configured as a lathe and includes a tool 6 adapted to machine a workpiece 7 by cutting—in this case by turning in a lathe. For example, the workpiece 7 is to be turned down to a predetermined diameter d, starting from an initial height ho over a total height H. The tool 6 rotates with a rotation speed n about a tool axis 8, while the workpiece 7 rotates significantly more slowly about a workpiece axis 9.

A control method is implemented via the computer program product 3 which will be described in more detail hereinafter with reference to the FIGS. 2 to 7.

Figure 2:
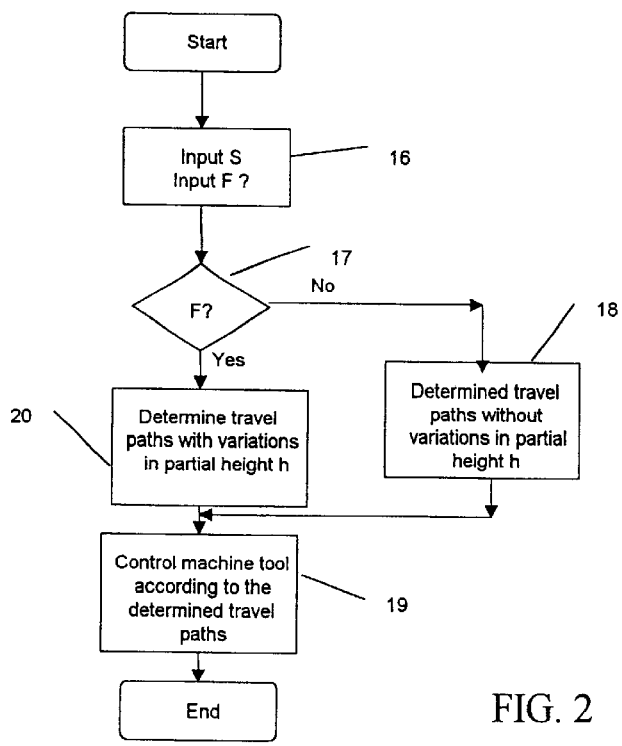
FIG. 2 is a flow diagram of an exemplary computer-aided control method.

As seen in FIG. 2, the control command S and optionally also a release command F are transmitted to the control computer 3 in a step 16. The control command S includes in particular the initial height ho and the total height H as well as the diameter d. The control command S therefore defines a contiguous region in which the workpiece 7 that is to be machined with the tool 6.

The control computer 2 then checks in step 17 if a release command F has been issued. If no release command F has been issued, then the control computer 2 automatically determines in step 18 based on the control command S a number of travel paths, based on which the workpiece 7 is machined in the region over a partial height h and in particular over the total height H. The partial height h is can be constant for each travel path as well as from one travel path to the next. So far, the travel paths are determined in the same manner as is known in the art. An example of such travel path is depicted in FIG. 3 in an unrolled representation. The machine tool 1 is then controlled by the control computer 2 in step 19 according to the travel paths determined in step 18.

By performing the machining operation according to step 18, the tool 6 can prematurely wear out. Accordingly, the release command F is not sent to the control computer 2 only if it is not desirable for particular reasons to apply the exemplary control method of the invention.

Conversely, if the release command F is sent to the control computer, then step 20 is executed instead of step 18. In step 20, the travel paths are determined in such away that the partial height h is varied, with the machine tool 1 being controlled according to the travel paths determined in step 20.

As depicted schematically in FIG. 4, the travel paths can be determined, for example, so that the partial height h remains constant during the travel paths themselves, but various between travel paths, for example increases from one travel path to the next. This situation is shown in FIG. 4—again in an unrolled representation—in that the spacing between the intersecting lines 10, which corresponds to the respective partial height h, increases from one intersecting line 10 to the next intersecting line 10.

Alternatively, the control computer 2 can also determine the travel paths in such away that the partial height h varies during at least one of the travel paths, preferably even during each of the travel paths. This will be explained in more detail hereinafter with reference to FIGS. 5 to 7.

As seen in FIG. 5, for example, the second, fourth, sixth, etc., intersecting line 10 are machined in an oblique pattern, wherein the first, third, fifth, etc., intersecting lines 10 are machined in a straight pattern. In this way, the partial height h during each travel path varies continuously and monotonously.

A similar approach is shown in FIG. 6. The difference between FIG. 6 and FIG. 5 is that the partial height h in FIG. 6 varies stepwise.

As indicated schematically in FIG. 7, other arbitrary travel paths for varying the partial height h are also possible. For example, as seen from the intersecting lines 10 in FIG. 7, the partial height h can be varied monotonously and also alternatingly for both a stepwise and a contiguous variation.

In each of the variations of the partial height h according to FIGS. 4 to 7, the partial height h varies between a minimum value min and a maximum value max. The maximum value max is preferably between 2 and 10 mm. The ratio between the minimum value min and the maximum value max is preferably between the 0.5 and 0.9, and more particularly between 0.6 and 0.8. Particularly advantageous values are between 0.65 and 0.75, for example 0.70.

In the above discussions, the ratio of minimum value min to maximum value max was assumed to be fixed. Alternatively, the ratio of minimum value min to maximum value max can also be explicitly provided to the control computer 2, together with the release command F, as a parameter P.

The exemplary control method according to the invention can prevent premature wear of the tool 6 in a simple manner.

While the invention has been illustrated and described in connection with preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A computer-aided control method for a machine tool adapted for machining a workpiece by cutting, in particular by lathe turning, over a predetermined region and a total height, the method comprising the steps of:

providing a control command to a control computer; and having the control computer, based on the control command, to automatically determine a plurality of travel paths of the machine tool, whereby the workpiece is machined over a partial height of the workpiece, with the partial height being varied during at least one of the plurality of travel paths when the workpiece is machined by the plurality of travel movements of the machine tool, wherein the partial height varies between a minimum value and a maximum value and the ratio of the minimum value to the maximum value is between 0.5 and 0.9.

2. The method of claim 1, wherein the partial height varies between the travel paths.

3. The method of claim 1, wherein the partial height is varied during each of the plurality of travel paths.

4. The method of claim 1, wherein the partial height is varied continuously.

5. The method of claim 1, wherein the partial height is varied in steps.

6. The method of claim 1, wherein the partial height is varied as a monotone non-decreasing function or a monotone non-increasing function.

7. The method of claim 1, wherein the partial height is varied alternatingly between a constant value and a value selected from the group consisting of a continuously varying partial height, a step-wise varying partial height, and a partial height that varies as a monotone non-decreasing function or a monotone non-increasing function.

8. The method of claim 1, wherein the ratio of the minimum value to the maximum value is between 0.6 and 0.8.

9. The method of claim 1, wherein the ratio of the minimum value to the maximum value is between 0.65 and 0.75.

10. The method of claim 1, wherein the partial height varies between a minimum value and a maximum value and the ratio of the minimum value to the maximum value is preset as a parameter in the control computer.

11. A computer program product executing on a control computer for controlling a machine tool adapted for machining a workpiece by cutting, in particular by lathe turning, over a predetermined region and a total height, the computer program product comprising computer instructions for:

provideing a control command to the control computer; and instructing the control computer, based on the control command, to automatically determine a plurality of travel paths of the machine tool, whereby the workpiece is machined over a partial height of the workpiece, with the partial height being varied during at least one of the plurality of travel movements when the workpiece is machined by the plurality of travel paths of the machine tool, wherein the partial height varies between a minimum value and a maximum value and the ratio of the minimum value to the maximum value is between 0.5 and 0.9.

12. A control computer for controlling a machine tool adapted far machining a workpiece by cutting, in particular by lathe turning, over a predetermined region and a total height, the control computer comprising:

means for providing a control command to a control computer; and means for automatically determining, based on the control command, a plurality of travel movements of the machine tool, whereby the workpiece is machined over a partial height of the workpiece, with the partial height being varied during at least one of the plurality of travel paths when the workpiece is machined by the plurality of travel paths of the machine tool, wherein the partial height varies between a minimum value and a maximum value and the ratio of the minimum value to the maximum value is between 0.5 and 0.9.

* * * * *